United States Patent
Suzuki et al.

[11] Patent Number: 5,980,423
[45] Date of Patent: Nov. 9, 1999

[54] SHIFT-LEVER DEVICES

[75] Inventors: Takayoshi Suzuki, Shizuoka; Takehiro Kuroda, Kanagawa, both of Japan

[73] Assignees: Fuji Kiko Co., Ltd., Tokyo; Nissan Motor Co., Ltd., Yokohama, both of Japan

[21] Appl. No.: 08/951,745

[22] Filed: Oct. 16, 1997

[30] Foreign Application Priority Data

Oct. 16, 1996 [JP] Japan .................................. 8-272765

[51] Int. Cl.$^6$ ................................................ B60K 20/20
[52] U.S. Cl. .................... 477/99; 192/220.4; 192/220.7; 74/483 R; 74/483 K
[58] Field of Search ..................... 477/99, 96; 74/483 R, 74/483 K; 192/220.4, 220.7, 4 A

[56] References Cited

U.S. PATENT DOCUMENTS

| | | | |
|---|---|---|---|
| 5,150,593 | 9/1992 | Kobayashi et al. | 477/99 |
| 5,186,069 | 2/1993 | Asano et al. | 192/220.4 |
| 5,197,356 | 3/1993 | Kobayashi et al. | 477/99 |
| 5,379,871 | 1/1995 | Asano et al. | 192/220.4 |
| 5,421,792 | 6/1995 | Kataumi et al. | 477/99 |
| 5,435,424 | 7/1995 | Murakami et al. | 192/220.7 |
| 5,490,585 | 2/1996 | Togano | 477/99 |
| 5,588,330 | 12/1996 | Kataumi et al. | 74/483 R |

FOREIGN PATENT DOCUMENTS

| | | | |
|---|---|---|---|
| 4-282060 | 10/1992 | Japan | 477/99 |
| 6-42614 | 2/1994 | Japan | 477/99 |
| 6-50416 | 2/1994 | Japan . | |
| 7-266908 | 10/1995 | Japan . | |

Primary Examiner—Tamara L. Graysay
Assistant Examiner—William C Joyce
Attorney, Agent, or Firm—Foley & Lardner

[57] ABSTRACT

A shift-lever device includes a key lever operating with key-lock mechanism, a sub lever independently rotatably arranged to the key lever and including a pin, a spring arranged to enable the key lever and the sub lever to rotate together, and a lock lever contacting the pin of the sub lever and operating with the key lever. The lock lever operates with the shift-lock mechanism to prevent and allow shifting of a shift lever from a predetermined position. The device also includes a release rod arranged to be operable from outside of the device and serving to rotate the lock lever to rotate the sub lever against the spring independently of the key lever.

6 Claims, 6 Drawing Sheets

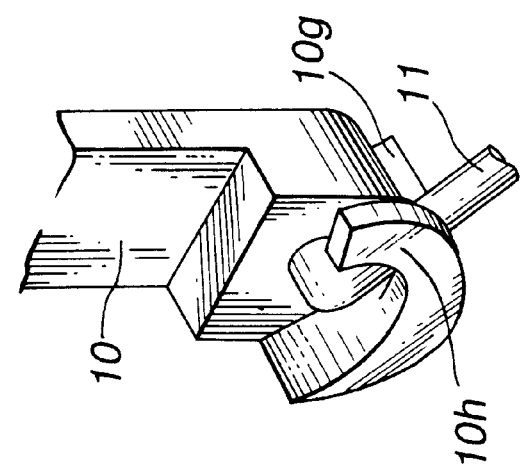
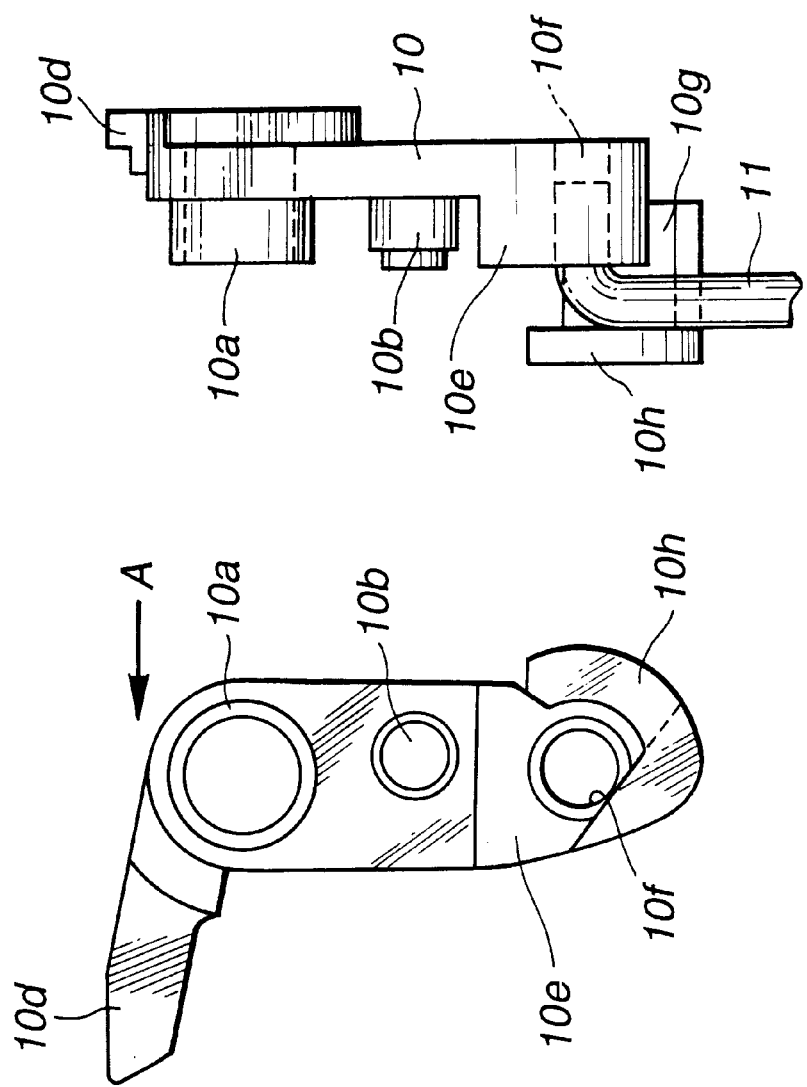

SHIFT-LEVER DEVICES

BACKGROUND OF THE INVENTION

The present invention relates generally to shift-lever devices for motor vehicles and more particularly to the shift-lever devices including a lock release mechanism.

Shift-lever devices have been proposed which include a lock mechanism operating based on a combination of shift-lock and key-lock mechanisms. The lock mechanism is constructed such that the key-lock mechanism prevents a shift lever from being moved from the parking position when parking a motor vehicle with an engine key removed, and the shift-lock mechanism prevents the engine key from being removed except when the shift lever is in the parking position, and the shift lever being moved therefrom unless a brake pedal is depressed when cruising the vehicle after engine start.

Specifically, when shifting the shift lever to the parking position P for engine stop, and removing the engine key for parking of the vehicle, a key cylinder is engaged with a steering shaft to obtain key lock, and an electric system of the vehicle is cut off. Referring to FIG. 6, an actuator 8 is turned off to press a plunger 7, which urges a lock lever 6 connected to the plunger 7 to rotate clockwise about a shaft 5 so as to move outside from a detent recess 3. However, since rotation of a key lever 10 connected to the key-lock mechanism through a joint rod 11 is restrained on the side of the key-lock mechanism, a pin 10a arranged in the rear of the key lever 10 touches the lock lever 6 to prevent rotation thereof. Thus, a position pin 2 is immovably restrained in the parking position P, disabling operation of the shift lever.

When removing key lock by inserting and rotating the engine key for cruising of the vehicle, the key cylinder is disengaged from the steering shaft which becomes rotatable by a steering wheel, and the key lever 10 becomes free of restraint to be rotatable. However, since the electric system is connected to turn on the actuator 8, and thus the lock lever 6 is kept being restrained in the detent recess 3, the position pin 2 is still immovably restrained in the parking position P.

When depressing the brake pedal for starting of the vehicle, the actuator 8 is turned off so that the lock lever 6 is moved outside of the detent recess 3 as indicated by two-dot chain line in FIG. 6, and the position pin 2 becomes free of restraint to be depressible through a knob of the shift lever, which allows the shift lever to be shifted to a desired range.

The shafts 5, 9 are supported by a gate wall formed with the detent recess 3, and the actuator 8 is fixed thereto. A support lever 13 operating with the key lever 10 to hold the position pin 2 is rotatably coaxially supported to the shaft 9. The support lever 13 serves to protect the key-lock mechanism by preventing direct transmission of a force produced when depressing the position pin 2 in the state as shown in FIG. 6. The key lever 10 and the support lever 13 are biased by a spring in the direction of holding the position pin 2.

With the known shift-lever devices, however, the shift-lock mechanism and the key-lock mechanism are mechanically connected to each other by a cable, etc., so that with the engine key removed, the shift lever cannot be shifted from the parking position P, resulting in difficulty of moving the vehicle.

It is, therefore, an object of the present invention to provide shift-lever devices including a mechanism for releasing a lock mechanism operating based on a combination of shift-lock and key-lock mechanisms.

SUMMARY OF THE INVENTION

According to one aspect of the present invention, there is provided a shift-lever device for an automatic transmission of a motor vehicle, the shift lever device having a shift-lock mechanism which allows shifting of a shift lever from a predetermined position upon a predetermined operation with a key-lock mechanism, the device comprising:

a key lever operating with the key-lock mechanism;

a sub lever independently rotatably arranged to said key lever, said sub lever including a pin;

a spring arranged to enable said key lever and said sub lever to rotate together;

a lock lever contacting said pin of said sub lever, said lock lever operating with said key lever, said lock lever operating with the shift-lock mechanism to prevent and allow shifting of the shift lever from the predetermined position; and a release rod arranged to be operable from outside of the device, said release rod rotating said lock lever to rotate said sub lever against said spring independently of said key lever.

Another aspect of the present invention lies in providing a shift-lever device for an automatic transmission of a motor vehicle wherein a shift lever is rotatably supported to a casing, the device comprising:

a key-lock mechanism arranged to prevent the shift lever being moved from a predetermined position;

a shift-lock mechanism arranged to allow shifting of the shift lever from said predetermined position upon a predetermined operation with said key-lock mechanism;

a key lever operating with said key-lock mechanism;

a sub lever independently rotatably arranged to said key lever, said sub lever including a pin;

a spring arranged to enable said key lever and said sub lever to rotate together;

a lock lever contacting said pin of said sub lever, said lock lever operating with said key lever, said lock lever operating with said shift-lock mechanism to prevent and allow shifting of the shift lever from said predetermined position; and a release rod arranged to be operable from outside of the casing, said release rod rotating said lock lever to rotate said sub lever against said spring independently of said key lever.

BRIEF DESCRIPTION OF THE DRAWINGS

FIG. 3A is a front view showing a key lever;

FIG. 3B is a view similar to FIG. 1, as seen from arrow A in FIG. 3A;

FIG. 3C is a fragmentary perspective view showing the key lever;

DETAILED DESCRIPTION OF THE INVENTION

Figure 1:
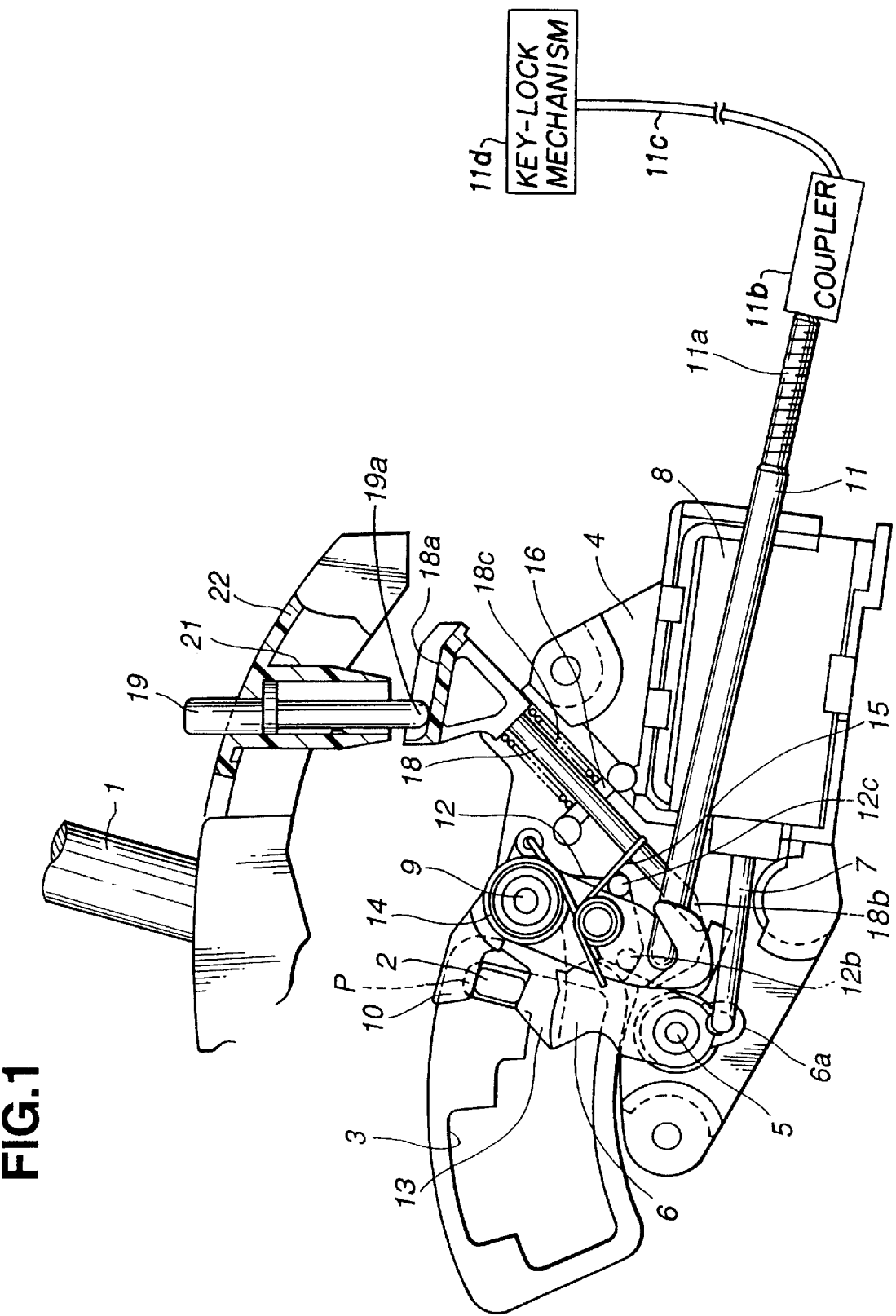
FIG. 1 is a side view showing an embodiment of a shift-lever device according to the present invention.

Referring to FIGS. 1–5, particularly to FIG. 1, a shift-lever device embodying the present invention comprises a shift lever 1, and a casing 22 fixed to a vehicular body, not shown, for rotatably supporting the shift lever 1. The casing 22 is formed with a detent recess 3 engaged with a position pin 2 of the shift lever 1, and has a side wall on which a unit base 4 is fixed. A shaft 5 is arranged to the unit base 4 in the lower portion on the side of a parking position P. A lock lever 6 is rotatably supported to the shaft 5, and a plunger engagement 6a is integrated with the lock lever 6. Engaged with the plunger engagement 6a is a free end of a plunger 7 of an L-shaped metal bar which protrudes from an actuator 8 including a solenoid, obtaining a shift-lock mechanism. The unit base 4 may be integrated with the side wall of the casing 22.

Figure 2:
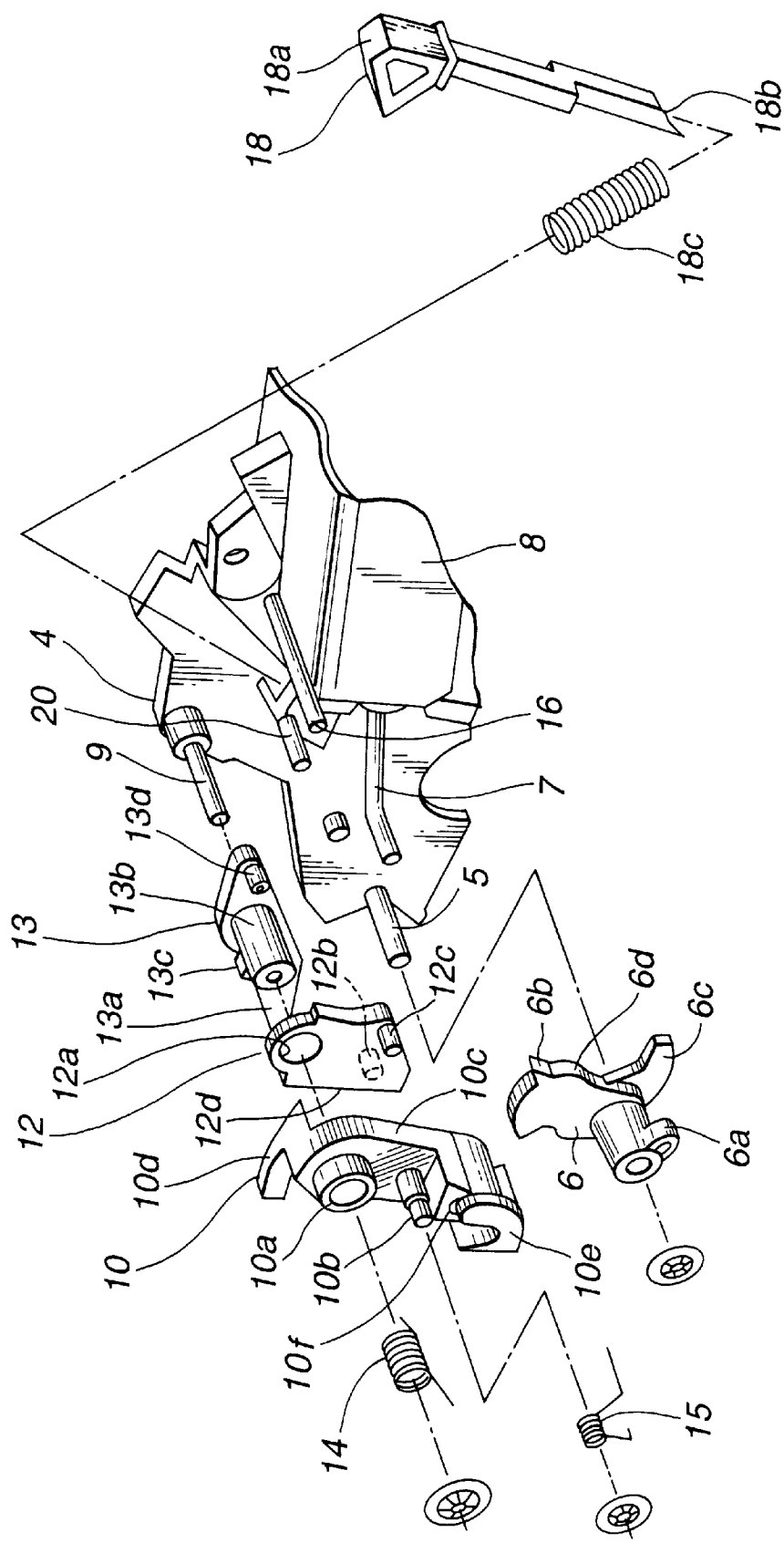
FIG. 2 is an exploded perspective view showing the shift-lever device.

Referring also to FIG. 2, the lock lever 6 includes a protrusion 6b arranged in the vicinity of the top and serving as a stopper for the position pin 2, and a lever 6c arranged at one end opposite to a base end of the shaft 5 and extending by a predetermined length. A side face between the protrusion 6b and the lever 6c includes a sliding surface 6d with which a pin 12b of a sub lever 12 can come in slide contact. The actuator 8 is fixed to the unit base 4. The plunger 7 includes a coil spring, and is constructed to magnetically withdraw against a force of the coil spring when the actuator 8 is turned on, and protrude by a force of the coil spring when it is turned off.

A shaft 9 is arranged to the unit base 4 in the vicinity of the top on the side of the parking position P of the detent recess 3. A key lever 10 is rotatably supported to the shaft 9 through a cylinder 10a integrated with the upper end of the key lever 10. A joint rod 11 of an L-shaped metal bar is rotatably connected to an engagement 10e integrated with the lower end of the key lever 10, and another end formed with a thread 11a connected to a cable 11c out of a key-lock mechanism 11d through a coupler 11b.

The key lever 10 has one side formed with the cylinder 10a for receiving the shaft 9 and a spring shaft 10b and another side formed with an engagement 10c engaged with a pin 12c of the sub lever 12 formed on another side, and an upper end formed with a corner 10d contacting the position pin 2 and a lower end formed with the engagement 10e rotatably undetachably engaged with one end of the joint rod 11. Referring to FIGS. 3A–3C, the engagement 10e is formed with a hole 10f for receiving an L-shaped end of the joint rod 11, a plate 10g on which the L-shaped end abuts partly, and an anti-detachment 10h which contacts the right-angled portion of the L-shaped end for preventing detachment of the joint rod 11. The key lever 10 is swingable on the shaft 9 by axial movement of the joint rod 11, operating with the key-lock mechanism.

The sub lever 12 has a shaft hole 12a formed at the upper end, pins 12b, 12c arranged on two sides of the right and left portions of the lower end, and a vertical plane 12d formed on the side face having the pin 12b. The pin 12b serves as a member with which the sliding surface 6d of the lock lever 6 is in slide contact, and the pin 12c serves as a second pin or stopper for preventing clockwise rotation of the sub lever 12 and engaged with the spring 15.

A support lever 13 is coaxially rotatably supported to the shaft 9 in the rear of the key lever 10 and the sub lever 12. The support lever 13 has one end 13a arranged opposite to the corner 10d of the key lever 10 for vertically holding the position pin 2 and formed with a cylindrical shaft 13b for receiving the shaft 9, and another end formed with a spring engagement 13d. The cylindrical shaft 13b is formed with a key 13c which serves as engaging means engaged with the key lever 10 so that a space is constant between the one end 13a of the support lever 13 and the corner 10d of the key lever 10. A protrusion 20 is arranged to the unit base 4 to restrain rotation of the key lever 10.

A key-lock spring 14 is wound on the cylinder 10a for integration of the key lever 10 with the support lever 13 in a predetermined range, and has one end engaged with the pin 10b and another end engaged with the spring engagement 13d of the support lever 13. Moreover, a spring 15 is wound on the pin 10b for integration of the key lever 10 with the sub lever 12 in a predetermined range, and has one end engaged with the engagement 10e of the key lever 10 and another end engaged with the pin 12c of the sub lever 12.

The unit base 4 includes a guide 16 with which a release rod 18 is engaged axially slidably. The release rod 18 has an upper end formed with a substantially triangular slide block 18a, and a pointed lower end 18b slidably contacting the lever 6c of the lock lever 6 to allow rotation of the lock lever 6 through a return spring 18c arranged between the slide block 18a and the guide 16. A push rod 19 extends upwardly of the casing 22 through a guide 21 formed therein, and has an upper end withdrawably outwardly protruding from the casing 22 and a lower end formed with a spherical surface 19a which contacts the slide block 18a.

Figure 4:
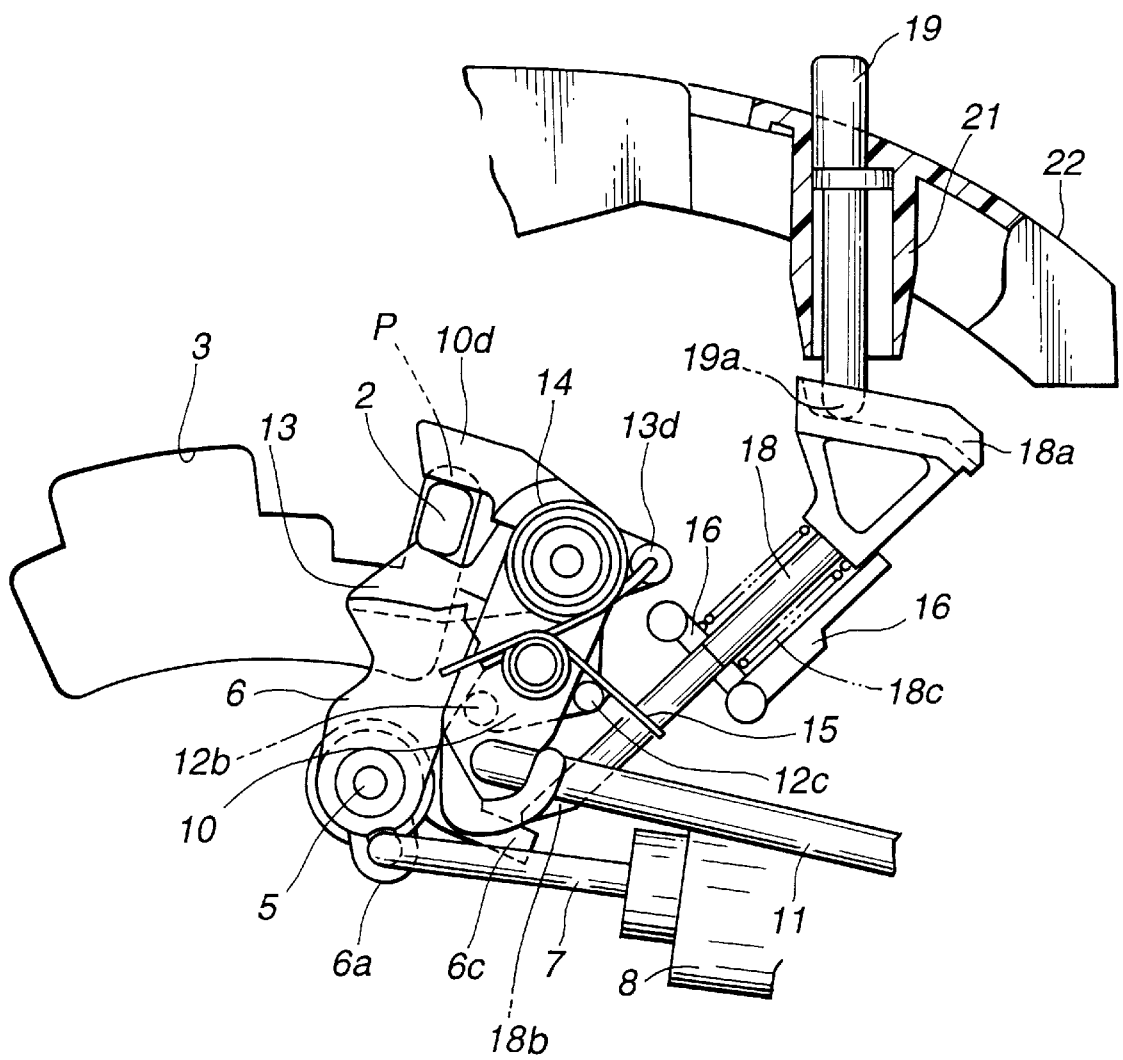
FIG. 4 is a view similar to FIG. 1, explaining the operation of the embodiment.
Figure 5:
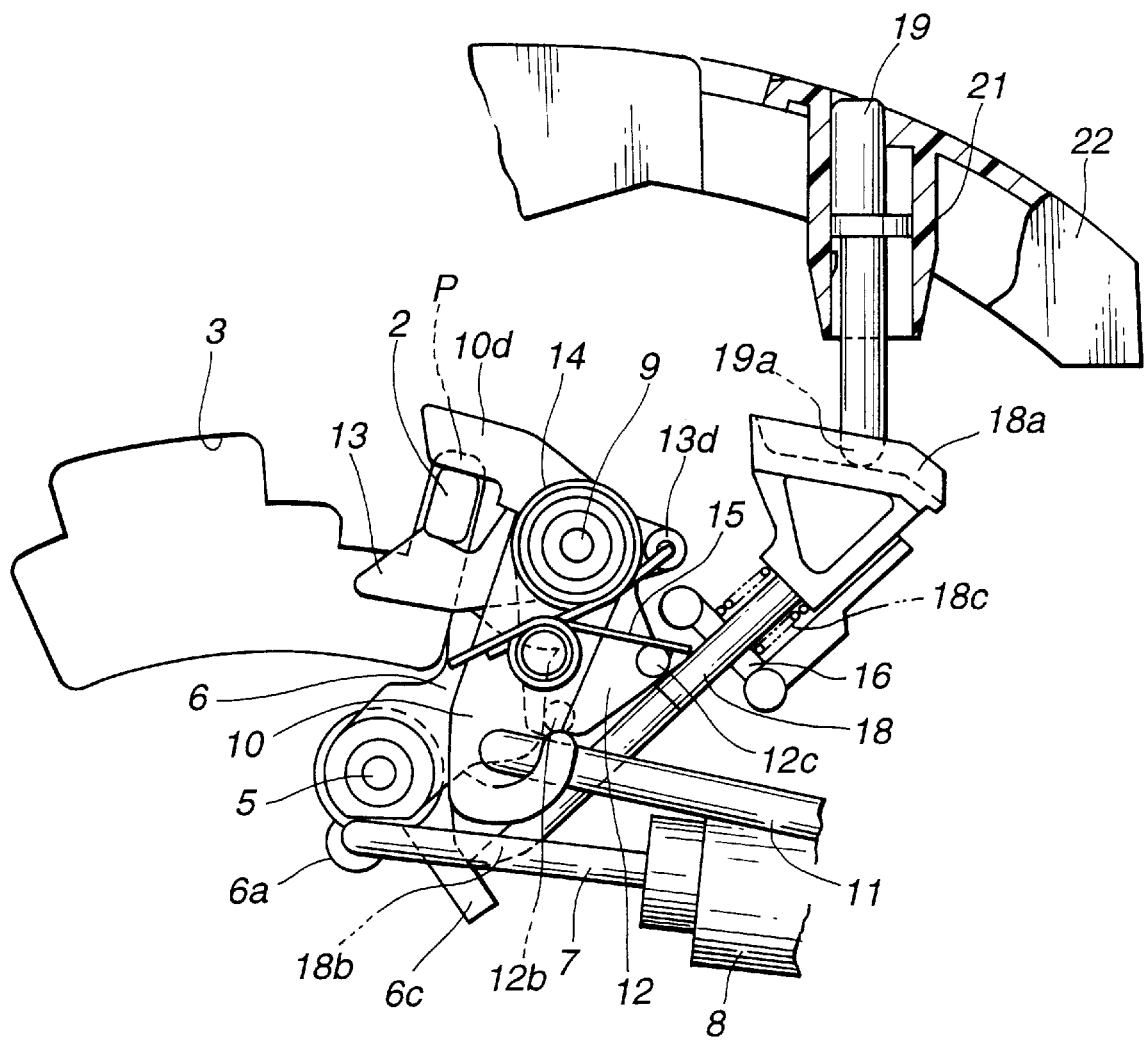
FIG. 5 is a view similar to FIG. 4, explaining the operation of the embodiment.
Figure 6:
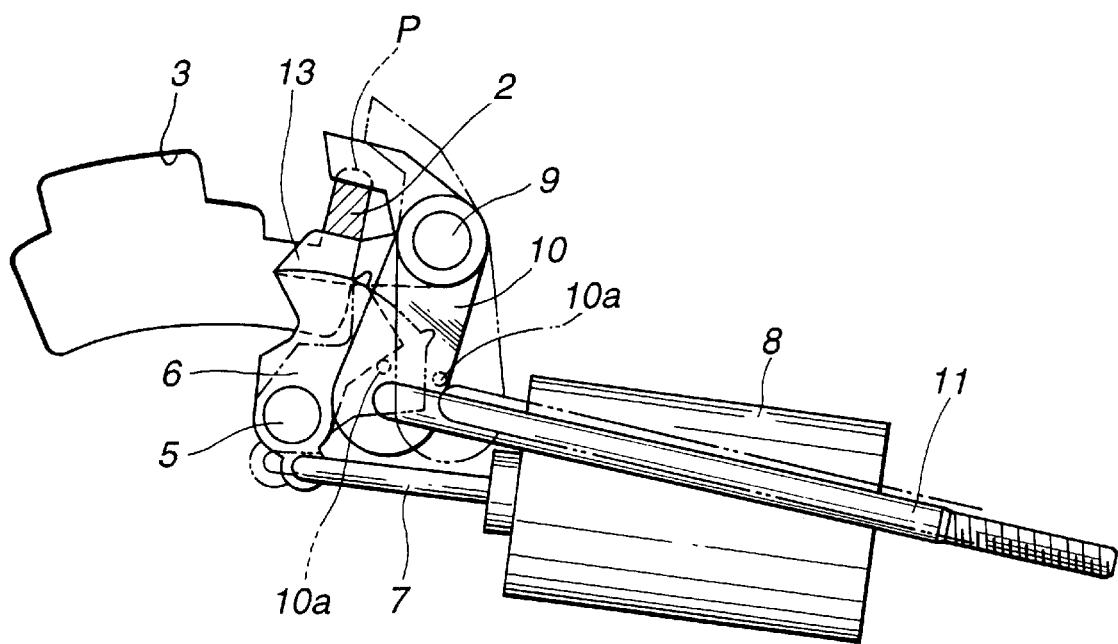
FIG. 6 is a view similar to FIG. 5, showing a known shift-lever device.

Next, the operation of the embodiment will be described. Referring to FIG. 4, in the parking state of the vehicle wherein the position pin 2 is put in the parking position P and restrained by the lock lever 6 and the key lever 10 and with key lock impossible to be released due to the engine key removed, when pushing the push rod 19 in accordance with a necessity of slight movement of the vehicle to axially downwardly slide the release rod 18, the lower end 18b of the release rod 18 is moved to contact the lever 6c of the lock lever 6 against a force of the return spring 18c to clockwise rotate the lock lever 6 about the shaft 5.

On the other hand, the key lever 10 is restrained operating with the key-lock mechanism. However, referring to FIG. 5, since the pin 12b which the lock lever 6 contacts is arranged to the sub lever 12, and the sub lever 12 is rotatable independently of the key lever 10 against a force of the spring 15, the lock lever 6 presses the pin 12b to move outside from the parking position P of the detent recess 3. Thus, the sliding surface 6d of the lock lever 6 presses the position pin 12b to rotate the sub lever 12. Therefore, if the position pin 2 is depressed in that state, the position pin 2 is moved downwardly to push the support lever 13 aside for rotation, enabling shifting of the shift lever 1 to another range. Therefore, parking lock of the vehicle can be removed to allow slight forward or backward movement thereof by man power.

Having described the present invention with regard to the preferred embodiment, it is noted that the present invention is not limited thereto, and various changes and modifications can be made without departing from the scope of the present invention.

What is claimed is:

1. A shift-lever device for an automatic transmission of a motor vehicle, the shift-lever device having a shift-lock mechanism which allows shifting of a shift lever from a predetermined position upon a predetermined operation with a key-lock mechanism, the device comprising:

a key lever operating with the key-lock mechanism;

a sub lever rotatably mounted to said key lever;

a spring arranged to bias said sub lever with said key lever to rotate together;

a first pin formed with said sub lever on a first side thereof;

a second pin formed with said sub lever on a second side thereof, said second pin preventing clockwise rotation of said sub lever by engaging said key lever, said second pin being engaged with one end of said spring;

a lock lever contacting said first pin, said lock lever operating with said key lever, said lock lever operating with the shift-lock mechanism to prevent and allow shifting of the shift lever from the predetermined position; and a release rod arranged to be operable from outside of the device, said release rod rotating said lock lever to rotate said sub lever against said spring independently of said key lever.

2. A shift-lever device as claimed in claim 1, wherein said spring is fixed to said key lever.

3. A shift-lever device as claimed in claim 1, further comprising a support lever, wherein said support lever and said key lever together hold said sub lever.

4. A shift-lever device as claimed in claim 3, wherein said support lever, said sub lever, and said key lever are arranged coaxially.

5. A shift-lever device for an automatic transmission of a motor vehicle, wherein a shift lever is rotatably supported to a casing, the device comprising:

a key-lock mechanism arranged to prevent the shift lever from being moved from a predetermined position;

a shift-lock mechanism arranged to allow shifting of the shift lever from said predetermined position upon a predetermined operation with said key-lock mechanism;

a key lever operating with said key-lock mechanism;

a sub lever rotatably mounted to said key lever;

a spring arranged to bias said sub lever with said key lever to rotate together;

a first pin formed with said sub lever on a first side thereof;

a second pin formed with said sub lever on a second side thereof, said second pin preventing clockwise rotation of said sub lever by engaging said key lever, said second pin being engaged with one end of said spring;

a lock lever contacting said first pin, said lock lever operating with said key lever, said lock lever operating with the shift-lock mechanism to prevent and allow shifting of the shift lever from the predetermined position; and a release rod arranged to be operable from outside of the casing, said release rod rotating said lock lever to rotate said sub lever against said spring independently of said key lever.

6. A shift-lever device as claimed in claim 5, wherein said spring is fixed to said key lever.

* * * * *